J. TAYLOR.
VEHICLE SANDING APPARATUS.
APPLICATION FILED DEC. 14, 1907.
902,626.
Patented Nov. 3, 1908.
3 SHEETS—SHEET 1.
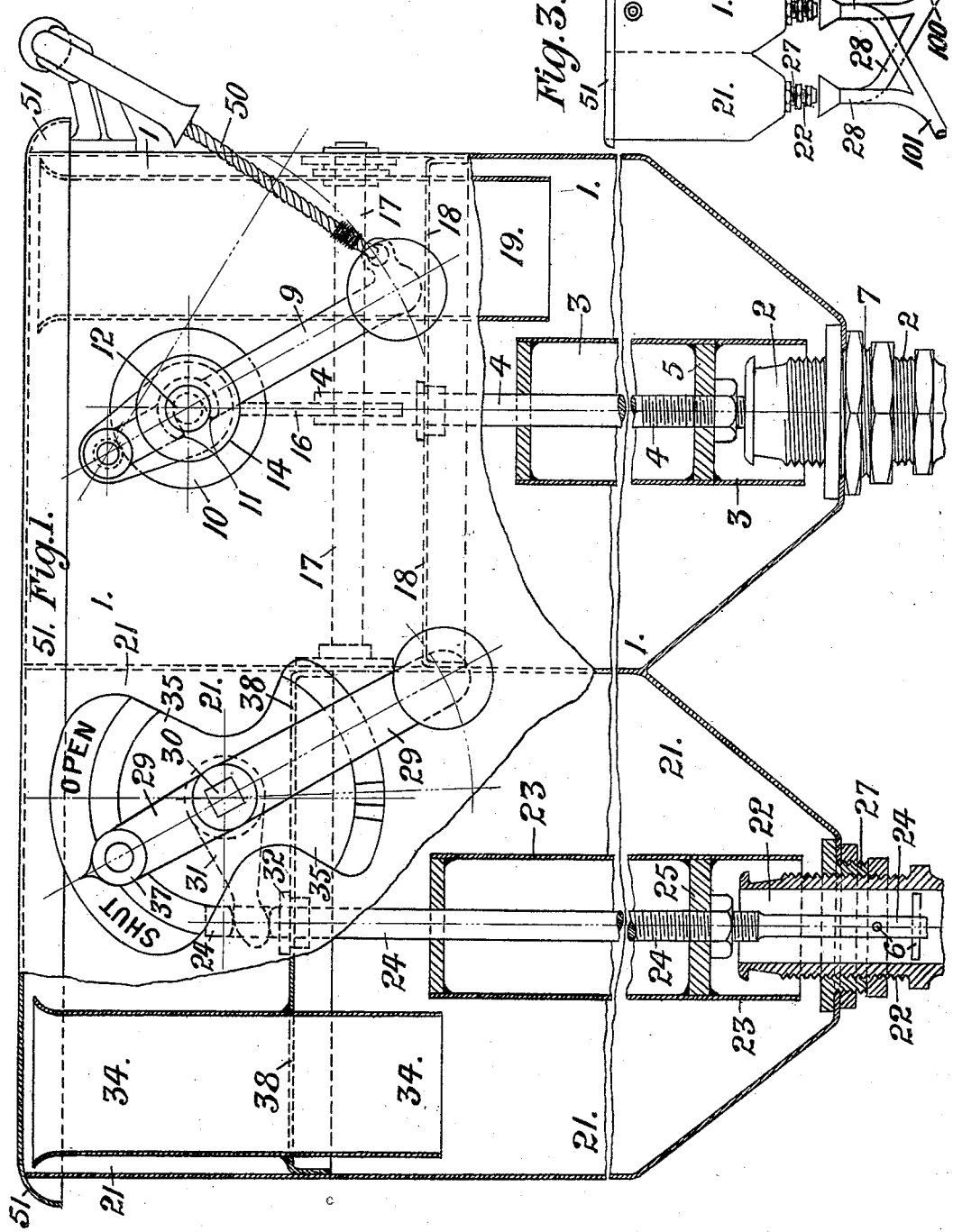
WITNESSES:
Edw. D. Spring.
W. P. Burke
INVENTOR.
John Taylor,
By Wm Wallace White
ATTY.

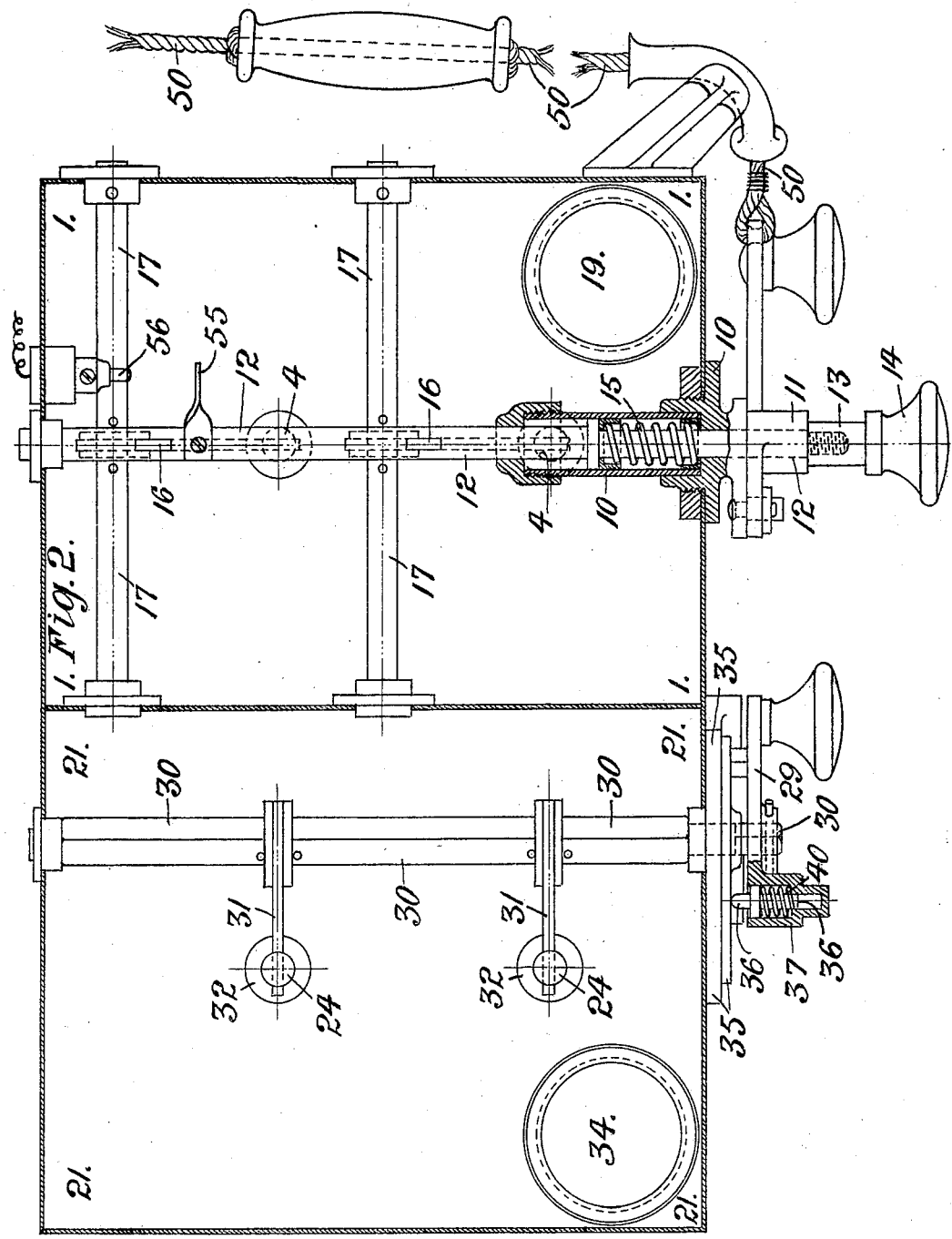

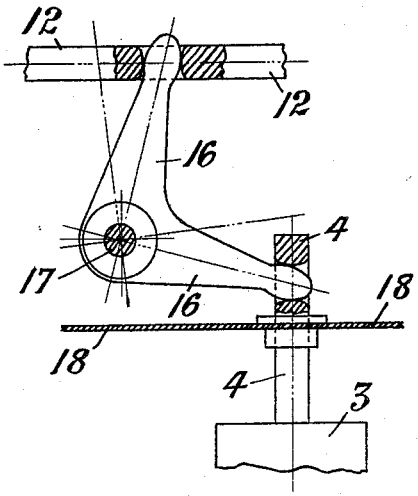
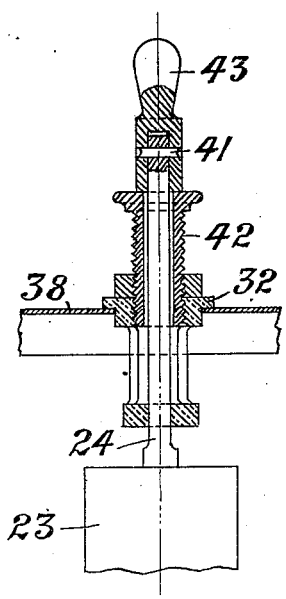
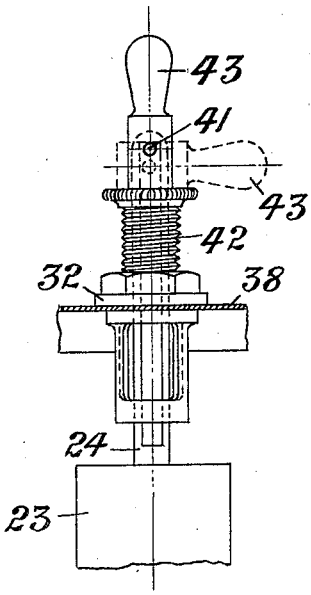

UNITED STATES PATENT OFFICE.

JOHN TAYLOR, OF LIVERPOOL, ENGLAND.

VEHICLE SANDING APPARATUS.

No. 902,626.    Specification of Letters Patent.    Patented Nov. 3, 1908.

Application filed December 14, 1907. Serial No. 406,556.

*To all whom it may concern:*

Be it known that I, JOHN TAYLOR, a subject of the King of England, residing at Liverpool, in the county of Lancaster, England, have invented new and useful Improvements in Vehicle Sanding Apparatus, of which the following is a specification.

This invention has reference to apparatus employed on vehicles, primarily street or road railway vehicles or cars, for supplying "sand" or granular material under the wheels of same, for the purpose of preventing the vehicle wheels skidding or slipping on the ways or surface on which they run, and for increasing friction between same.

The invention as stated, is primarily intended for use in connection with street or road self-propelled tramway cars or vehicles, and it comprises the use in connection with same of an "emergency" sanding apparatus, by which, when, say, the car or vehicle is running away, or is out of the control of the driver or guard, or under circumstances or at times when extra or abnormal friction and grip is required between the wheels and the rails, an extra supply of sand or granular substance, or sand or granular substance of a special character or type, can be supplied to the rails in front of the wheels. This special apparatus consists of a container or containers for the sand or granular substance, having within it a special form and arrangement of valve or valves hereinafter described, for controlling the discharge of same from the container, and a hand operated (or foot operated) device, which, when operated—say moved in one direction, will lift or cause to be lifted or operate the valves, and open the conduits which they control, and allow the contents to pour down the sand or granular material conveying tubes to the rails. This operating device, in one arrangement, is so contrived that by moving say, a hinged or jointed or moving part for a certain degree, it will release a spring (or weight) which will lift the valve or valves, and keep them open until such time as it may be desired to close them. The apparatus is, also in some cases, so arranged and adapted that the sand or granular material can be supplied in a regulated quantity continuously to the rails or ways, or intermittently; and to this end, at one part of it, there is employed a supply arrangement, which, upon being operated or set, will supply sand or granular material from the container through suitable pipes to the track continuously, in regulated quantities, say at a relatively slow rate, so that the whole length of track, or certain lengths of track, can be "sanded" by this apparatus without operating anything, or requiring the attention of the driver or other in authority, after having been set for or in action. Further, according to this invention, two separate containers with distributing regulating valves or means are employed, having connected with them—*i. e.,* both of them, or both of their outlets, a common conduit leading to points on each side of the track above the rails—or only one if desired. And one of these containers may be adapted to supply the material continuously in a regulated quantity, while the other may be adapted to supply the material—which may be a special kind possessing special frictional properties—at moments of emergency, and act as an emergency sander.

The invention will be further described with reference to the accompanying drawings which illustrate apparatus of the kind referred to, which show, the valves hereunder, and two sets of apparatus; one for an emergency or intermittent supply, and the other for a continuous supply.

In these drawings, Figure 1 is a front elevation partly in section; Fig. 2 is a plan in section; and Fig. 3 is a general view to a small scale showing the conveyer conduits for the material. Fig. 4 is a detail of a part. Fig. 5 is a transverse section through a continuous supply sanding part of the apparatus, showing a modified form of actuating parts thereof; and Fig. 6 is a side view of same.

Referring now to the drawings, and more particularly to Figs. 1 to 3 in the first instance, 1 designates generally the container for containing the sand or granular frictional material which is to be used for the emergency or intermittent supply; and 21 represents the container for holding the material to be supplied continuously. 2 and 22 are the discharge pipes of these two vessels 1 and 21, respectively, and they deliver preferably into tubes 8, 28, which have funnel-shaped inlets or mouths to them as shown, and each pair of tubes 8, 28, join up in a common delivery pipe 100, 101, respectively, the end of which will come over the line to be sanded. 3 and 23 are the valves connected with the chambers 1 and 21, respectively, which work in connection with the pipes 2 and 22.

In the arrangement shown, the two containers 1 and 21 are arranged in twin form, being arranged side by side, with a partition between them; and each of them has two valves 3 and 23, respectively, so that there will be four valves or controlling devices in the complete apparatus, with their pairs of discharge pipes 2, 22, and two conveying pipes 100, 101. The bottom of the containers 1, 21, are tapered or conical, so as to lead the sand or material towards their respective outlet conduits 2 and 22, disposed in the bottom of same; and these conduits 2 and 22, project up above the bottom of the containers 1 and 21 as shown.

The controlling valves 3 and 23 are of tubular form, and fit over upwardly projecting parts of the discharge conduits 2 and 22, with an annular space between the outside of the conduits, and the inside of the valves; and when the flow of sand is to be, and is cut off, the ends of the valves 1, 21, project down some distance below the level of the lip of the discharge conduits 2 and 22. The upper edge or lips of these conduits 2 and 22 may be made with a small annular external projection, which serves as a species of check to the sand or granular material rising up over the lip into the tube, and leaking away, when not required, that is, when the valves are down in their lower position. The valves 3 and 23, have each a stem or rod 4 and 24, respectively, extending down through them from the upper part of the containers 1 and 21; and they are adjustable vertically upon these stems or rods by a nut screwing onto the stems below the partitions 5 and 25, inside the valves 3 and 23. The rods 4 and 24 have cross pins 6, (see the left hand part of the apparatus in Fig. 1) which serve as guides, and do not obstruct the flow of granular material.

By the means of adjusting the valves 3 and 23, described, the position to which their lower edge can be moved in their lower or closed position, and in their upper or open position, in relation to the lips of the discharge tubes 2 and 22 can be governed and adjusted as required. Or, this can be effected by adjusting vertically the discharge tubes 2 and 22 in their sockets or bushes 7 and 27, by threading the inside of these sockets and the outside of the tubes 2 and 22, as shown, and screwing these tubes up or down to the required degree, so that their lips may be made to stand at any suitable levels in the containers; and this level may be higher in one than the other, or in any relationship that may be deemed expedient.

With regard to the means for operating the emergency sand or granular substance supplying apparatus or container 1, in the construction particularly shown in the drawings, this is of a kind which, when a hand (or foot) moved part is operated—say moved in one direction—will lift, or cause to be lifted or operate the valves or regulators 3, and open the conduits 2 which they control, and allow the contents to pour down the conveyer tubes 8 and 100 to the rails.

The hand and foot actuating part consists of a lever 9 hinged to a suitable fitting 10, on the container 1, and having a gab or jaw 11 in it, which fits over a spindle 12 extending horizontally across the container, and having an enlarged part or collar 13, with a knob 14 on its end, which in the "closed" position just comes outside the gab 11; while within the container 1 is a spring 15, held by the hinge fitting 10, and pressing the shaft 12 normally into the container. Motion is transmitted from the shaft 12 and the valve rods 4 through bell cranks 16, mounted on the transverse shaft 17, one end of such bell cranks working in slots in the shaft 12, and the other in the ends of the valve rods 4. When the gab 11 is removed from the part 13 by knocking out the lever 9, the spring 15 instantly moves the shaft 12 longitudinally, and so lifts the valve rods 4, and with them the valves 3; thereby allowing the full flow of sand or granular material to take place down the discharge pipes 2. The spring will keep the valves open until such a time as it may be desired to close them, which is simply done by pulling the knob 14, which allows the gab lever 9 to fall of itself down into position over the shaft 12. This lever 9 can be worked from either end, or any suitable part of the vehicle, by suitable cord connections 50.

By this apparatus it will be seen that means are provided by which an emergency sand supply can be obtained by the driver or guard, or both, instantly, by simply pushing a part with the hand or foot; and when started it will continue to pour sand or granular material onto the track; while, also, an apparatus is provided by which a continuous and relatively small supply can be given to the rails for any length of time, also without attention on the part of the driver or guard, beyond first starting, and then stopping it. The sand or granular material used in one container or apparatus may be different from the other. For instance, in the emergency container or apparatus, the sand or granular material may be a special or artificially-prepared mixture of materials, which will produce greater friction or adhesion between the wheels and rails than simple sand.

With regard to the "continuous" supply apparatus, the valves 23 are moved up or down to the required degree, or to the complete "shut" or "open" position by means of a lever 29, fastened onto the end of a spindle 30, extending across the upper part of the container 21, and connected with the valve rods 24 by arms 31, the ends of which fit in slots in the upper ends of the rods 24, which themselves are guided by sleeve guides 32 supported in a removable partition 38, which carries in it the tube 34, through which the container below the partition 38 is charged with material.

The lever 29 works in connection with a fitting 35 fastened on the front of the container 21, having upon it the words "Open" and "Shut"; and the upper end of this lever has a stud 36 working in a case 37 on its upper end, and normally pressed inwards by a spring 40, onto the face of the fitting 35, such spring being of such strength as to press the stud to that degree which will insure the lever 29 and the parts it operates, remaining in the position to which they have been moved by the operator, while allowing of their being easily moved by the operator. By this means, a continuous and relatively small supply of sand or granular material can be supplied from the car or vehicle for any desired distance, by opening the regulating device or valve 23 to the required extent, and when it is desired to cease the supply, the regulating lever 29 has simply to be moved back to its "shut" or "off" position.

In some cases, the valves 23 may be so set, that when the parts are in the "open" position, no sand or material will flow under the lip of the valves 23, and over the lips of the discharge conduits 22 when the vehicle is stationary; but when the vehicle moves, the vibration will cause the sand to move and discharge at the required regulated and relatively small rate. In such condition, in the "open" position, the lower lip of the valve 23 will be somewhat below the upper lip of the tube 22; but this difference of level will depend upon the character or quality of the frictional material or sand employed. With regard to this latter mode of supplying sand, a form of actuating or valve setting device is illustrated in the modification shown in Figs. 5 and 6, which will be hereinafter described.

Referring now to the modification shown in Figs. 5 and 6, the valve rods 24 are each actuated directly by a lever 43 hinged to the upper end of said rods, the distance between the hinge pin 41, and the outer end of said lever, being greater than the distance of such pin and the side of same, whereby when the lever is moved into the vertical position from the horizontal position, the valve rod 24 and the valve connected with it will be lifted, and open to the required extent to give the required supply when the vehicle moves, but not otherwise; while when it is in the horizontal position, the valve will be dropped, and no supply will take place when the vehicle is moved. This degree of raising and lowering of the valves can be adjusted by the threaded sleeve 42 which screw through the necks 32, that is, by screwing these sleeves 42 up or down, it will be seen that the valves will be raised more or less, when the setting levers 43 are moved to their vertical position.

It will be plain that while the apparatus as shown in the drawings, is adapted to supply sand or granular material in an emergency or intermittently, or to supply it in small quantities continuously, by the use of one or other of the containers 1 or 21, and the mechanism they contain, one or other of these parts can be employed separately; and in such a case, assuming the part 1 and mechanism connected with it be employed, that is, the "emergency" portion of the apparatus be employed, this apparatus besides being adapted to supply sand in quantities on emergency or intermittently, may also, if desired, in some cases, be adapted to give a small continuous supply of sand or granular material when the car is running, due to vibration; while, otherwise, when the car is stationary, no supply will take place; this being accomplished by so setting the lower edge of the valves 3, and the upper lip of the discharge tubes 2, in relative levels, that the head of sand in the container 1, and the vibration of the vehicle, will cause a fine dribble of sand over the discharge lip of the tubes 2. If this continuous sanding is availed of, the apparatus is nevertheless capable of being used as an "emergency" apparatus as above described, as by simply releasing the catch or detent 9, which holds the valves down against the spring 15, the valves would be fully opened, and a full and free flow of sand would be given.

The container 1 and 21 have each a removable partition 18 and 38 respectively in it, in which is fixed the tubes 19 and 34, through which the containers are charged with the sand or material; and the whole of the apparatus, namely, the containers 1 and 21, are normally closed at the top by a common lid 51. The containers in many cases can be conveniently placed by the stairs to the upper part of a vehicle, or to the front of the car, or at any suitable part, so that they can be easily operated by hand or foot of the driver or guard, or both, through suitable actuating means such as referred to.

With regard to the material used, this may be in the form of ordinary sand, or granules of the size of sand, or small gravel, shells, etc. as the form of the valves is such that they will enable many different forms of granular material to be used.

In connection with the apparatus herein described there is employed in addition to the ordinary foot-operated sound signaling gong or bell of the vehicle or locomotive, a separate or special gong or bell, which is adapted to be operated when the emergency sanding apparatus—namely the container 1 and mechanism comprised in it—is put in action, so that when a vehicle of the kind referred to, is running away down a hill, or at a dangerous speed, and the driver has difficulty in checking the speed, and the emergency sanding apparatus is employed, then the emergency or special danger gong or bell or the like will be automatically put in action and sounded. This is effected by employing in connection with the spindle 12 of container 1, connected with the spring 15 and the valves 3, a tappet 55, and a contact 56 on the container case 1, these parts being electrically connected up by circuit wires with the gong or other sounding apparatus to be operated electrically. Hence, when the gab lever or operating device 9 is knocked away, so as to free the spring 15—which is held under strain—the valves 3 will be opened, and the tappet contact 55 will make connection with the contact 56, and the bell or sounding device circuit closed, and so the bell or gong sounded; and it will continue to be sounded so long as the valves of this emergency sanding apparatus are open.

What is claimed is:—

1. In a vehicle or locomotive sanding apparatus, the combination of a container; a discharge conduit; a valve working in connection with such conduit for controlling the discharge of material, and normally closing such aperture; a spring connected with said valve; and a detent connected with the spring, and adapted normally to keep said spring under strain, and when operated, to release said spring, whereby such spring in relaxing, opens the valve; substantially as set forth.

2. In a vehicle or locomotive sanding apparatus, the combination of a tubular valve; a discharge conduit, the entrance of which stands within the lower end of such valve when closed; a spring connected with said valve; a longitudinally movable hand-operated part for putting such spring under strain, and closing the valve; and a detent normally operating in connection with and engaging said handle, and holding the spring under strain, and adapted to release same when removed from such engagement or holding; substantially as set forth.

3. A vehicle or locomotive sanding apparatus comprised of two containers, each having a tubular valve and upwardly projecting discharge conduits normally closed by said valve, and a spring connected with the valve of one container, normally under strain when the valve is closed, a detent adapted to normally engage with the spring device, and hold said spring under strain, and a regulating means connected with the valve of the other container, by which the lift of said valve can be regulated, and the levels between the bottom of the last named tubular valve, and the upper lip of the conduit 22, which projects up above this level within it, can be varied for varying the supply of sand; as set forth.

In testimony whereof I have signed my name to this specification in the presence of two subscribing witnesses.

JOHN TAYLOR.

Witnesses:
SOMERVILLE GOODALL,
WALTER MONTAGU HARRISON.